(12) United States Patent
Akisada et al.

(10) Patent No.: US 9,181,836 B2
(45) Date of Patent: Nov. 10, 2015

(54) SECONDARY AIR SUPPLY SYSTEM AND SECONDARY AIR SUPPLY METHOD FOR INTERNAL COMBUSTION ENGINE

(75) Inventors: Kazuhiro Akisada, Toyota (JP); Toru Yaeo, Anjo (JP); Shinya Kondo, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 717 days.

(21) Appl. No.: 13/480,992

(22) Filed: May 25, 2012

(65) Prior Publication Data

US 2012/0303241 A1     Nov. 29, 2012

(30) Foreign Application Priority Data

May 27, 2011  (JP) ................................. 2011-119013

(51) Int. Cl.
*F01N 3/00* (2006.01)
*F01N 3/22* (2006.01)
*F01N 3/32* (2006.01)
*F01N 9/00* (2006.01)

(52) U.S. Cl.
CPC *F01N 3/22* (2013.01); *F01N 3/225* (2013.01); *F01N 3/32* (2013.01); *F01N 9/00* (2013.01); *Y02T 10/20* (2013.01); *Y02T 10/47* (2013.01)

(58) Field of Classification Search
CPC ............. F01N 3/22; F01N 3/225; F01N 3/32; F01N 9/00; Y02T 10/20; Y02T 10/47

USPC ..................... 60/274, 300, 304, 305
See application file for complete search history.

(56) References Cited

U.S. PATENT DOCUMENTS

| 7,543,444 B2 | 6/2009 | Oi et al. | |
| 8,015,804 B2* | 9/2011 | Muraguchi | 60/289 |
| 2006/0048504 A1* | 3/2006 | Oi et al. | 60/289 |
| 2007/0039312 A1* | 2/2007 | Kondo | 60/277 |

FOREIGN PATENT DOCUMENTS

| JP | 2005-337033 A | | 12/2005 |
| JP | 2007-024034 A | | 2/2007 |
| JP | 2007-120388 A | | 5/2007 |
| JP | 2007120388 A | * | 5/2007 |
| JP | 2007-270730 A | | 10/2007 |
| JP | 2007270730 A | * | 10/2007 |
| JP | 2009-293480 A | | 12/2009 |
| JP | 2010-261380 A | | 11/2010 |

* cited by examiner

*Primary Examiner* — Jason Shanske
*Assistant Examiner* — Matthew T Largi
(74) *Attorney, Agent, or Firm* — Dinsmore & Shohl LLP

(57) ABSTRACT

In an internal combustion engine that includes a first secondary air supply unit having a first air pump and a first air switching valve and a second secondary air supply unit having a second air pump and a second air switching valve, a time difference is provided between the operation start timing of the first air pump and the operation start timing of the second air pump, and the open timing of the first air switching valve and the open timing of the second air switching valve are set so as to be simultaneous with each other.

8 Claims, 3 Drawing Sheets

SECONDARY AIR SUPPLY SYSTEM AND SECONDARY AIR SUPPLY METHOD FOR INTERNAL COMBUSTION ENGINE

CROSS REFERENCE TO RELATED APPLICATIONS

This application claims priority to Japanese Patent Application No. 2011-119013 filed on May 27, 2011, which is incorporated herein by reference in its entirety including the specification, drawings and abstract.

BACKGROUND OF THE INVENTION

1. Field of the Invention

The invention relates to a secondary air supply system and secondary air supply method for an internal combustion engine, which supply air into exhaust gas from the internal combustion engine.

2. Description of Related Art

A catalyst is arranged in an exhaust passage of an internal combustion engine, and toxic substances of exhaust gas are purified by the catalyst through oxidation-reduction reaction. In order to activate the catalyst so as to purify exhaust gas, the temperature of the catalyst needs to be higher than or equal to its activating temperature. Therefore, in order to quickly ensure exhaust gas purification performance after a start-up of an engine, the temperature of the catalyst needs to be early increased.

Then, in an art, there is suggested an internal combustion engine that includes a secondary air supply system as described in Japanese Patent Application Publication No. 2007-024034 (JP 2007-024034 A) to thereby early increase the temperature of the catalyst. The secondary air supply system is formed such that a secondary air supply passage in which an air pump that pressurizes air and discharges the pressurized air and an air switching valve that opens to permit or closes to prohibit introduction of air, discharged from the air pump, into exhaust gas are arranged is connected to the upstream side of a catalyst in an exhaust passage. In an internal combustion engine that includes such a secondary air supply system, secondary air is supplied into exhaust gas and the air-fuel ratio of burned air-fuel mixture is enriched to cause unburned fuel to be burned on the catalyst to thereby make it possible to early increase the temperature of the catalyst.

Note that the secondary air supply system described in JP 2007-024034 A is formed such that a secondary air supply passage in which an air pump and an air switching valve are provided is connected one by one to each of two exhaust pipes in which catalysts are respectively arranged. In such a secondary air supply system that includes two secondary air supply units, as the two air pumps simultaneously start operation, a voltage drop of a battery may become excessively large because of large inrush currents of the air pumps. Therefore, in this secondary air supply system, a time difference is provided between the timings at which the two air pumps start operation to thereby suppress a voltage drop of the battery.

Incidentally, in the thus configured secondary air supply system, at the time at which the pressure of supplying secondary air sufficiently increases after a lapse of a predetermined period of time from the start of operation of the air pumps, the air switching valves are opened. Therefore, when a time difference is provided between the operation start timings of the two air pumps, a time difference also occurs between the timings at which the two air switching valves are opened. When the air switching valve is opened, operation sound occurs because of a variation in pressure in the valve. Therefore, as a deviation occurs between the timings at which the two air switching valves open, the above described sound successively occurs twice, so the operation sound of each air switching valve becomes a tone that causes a passenger to experience a feeling of strangeness.

SUMMARY OF THE INVENTION

The invention provides a secondary air supply system and secondary air supply method for an internal combustion engine, which are able to appropriately suppress a feeling of strangeness due to the operation sound of each air switching valve while suppressing a voltage drop of the battery due to inrush currents of the air pumps.

A first aspect of the invention provides a secondary air supply system for an internal combustion engine including a plurality of secondary air supply units. Each of the secondary air supply units includes an electric air pump and an air switching valve. The electric air pump pressurizes air and discharges the pressurized air. The air switching valve opens to permit or closes to prohibit introduction of the air, discharged from the air pump, into exhaust gas. The secondary air supply system includes a control unit configured to provide a time difference between operation start timings of the air pumps of the respective secondary air supply units and a time difference between open timings of the air switching valves of the respective secondary air supply units, and configured to set the time difference between the open timings of the air switching valves so as to be shorter than the time difference between the operation start timings of the air pumps.

With the above configuration, the time difference is provided between the operation start timings of the air pumps of the respective secondary air supply units to thereby make it possible to suppress a voltage drop of the battery due to inrush current at the time of starting the operation of each air pump. Here, where a period of time from when the operation of the air pump of each secondary air supply unit to when the corresponding air switching valve is opened is constant, when the operation start timings of the respective air pumps are shifted to an extent such that a voltage drop of the battery may be suppressed, a deviation between the open timings of the respective air switching valves increases, and the tone of the operation sound causes a feeling of strangeness.

In that respect, in the above described configuration, the time difference between the open timings of the air switching valves of the respective secondary air supply units is set so as to be shorter than the time difference between the operation start timings of the air pumps of the respective secondary air supply units. Therefore, while the time difference between the operation start timings of the air pumps is set to an extent such that a voltage drop of the battery may be suppressed, it is possible to reduce the time difference between the open timings of the air switching valves to an extent such that the tone of the operation sounds of the air switching valves does not cause a feeling of strangeness. Thus, with the above described configuration, while a voltage drop of the battery due to inrush currents of the air pumps is suppressed, it is possible to appropriately suppress a feeling of strangeness caused by the operation sounds of the air switching valves.

A second aspect of the invention provides a secondary air supply system for an internal combustion engine including a plurality of secondary air supply units. Each of the secondary air supply units includes an electric air pump and an air switching valve. The electric air pump pressurizes air and discharges the pressurized air. The air switching valve opens to permit or closes to prohibit introduction of the air, discharged from the air pump, into exhaust gas. The secondary air supply system includes a control unit configured to provide a time difference between operation start timings of the air pumps of the respective secondary air supply units, and configured to set open timings of the air switching valves of the respective secondary air supply units so as to be simultaneous with each other.

With the above configuration, the time difference is provided between the operation start timings of the air pumps of the respective secondary air supply units, but the open timings of the air switching valves of the respective secondary air supply units are set so as to be simultaneous with each other. Therefore, a voltage drop of the battery is suppressed, while the operation sounds of the air switching valves of the respective secondary air supply units are superimposed on each other to hear as a single sound. Thus, with the above described configuration, while a voltage drop of the battery due to inrush currents of the air pumps is suppressed, it is possible to appropriately suppress a feeling of strangeness caused by the operation sounds of the air switching valves.

A third aspect of the invention provides a secondary air supply system for an internal combustion engine including a first secondary air supply unit and a second secondary air supply unit. Each of the first secondary air supply unit and the second secondary air supply unit includes an electric air pump and an air switching valve. The electric air pump pressurizes air and discharges the pressurized air. The air switching valve opens to permit or closes to prohibit introduction of the air, discharged from the air pump, into exhaust gas. The secondary air supply system includes a control unit configured to start operation of the air pump of the second secondary air supply unit at the time when a prescribed period of time has elapsed from when operation of the air pump of the first secondary air supply unit is started, and configured to set a period of time from when the operation of the air pump of the second secondary air supply unit is started to when the air switching valve of the second secondary air supply unit is opened so as to be shorter than a period of time from when the operation of the air pump of the first secondary air supply unit is started to when the air switching valve of the first secondary air supply unit is opened.

With the above configuration, the time difference is provided between the operation start timings of the respective secondary air supply units to thereby suppress a voltage drop of the battery due to inrush current at the time of starting the operation of each air pump. On the other hand, the time difference between the open timings of the air switching valves of the respective secondary air supply units is set so as to be shorter than the time difference between the operation start timings of the air pumps. Therefore, while the time difference between the operation start timings of the air pumps is set to an extent such that a voltage drop of the battery may be suppressed, it is possible to reduce the time difference between the open timings of the air switching valves to an extent such that the tone of the operation sounds of the air switching valves does not cause a feeling of strangeness. Thus, with the above described configuration, while a voltage drop of the battery due to inrush currents of the air pumps is suppressed, it is possible to appropriately suppress a feeling of strangeness caused by the operation sounds of the air switching valves.

In the secondary air supply system according to the above third aspect, the control unit may be configured to set the period of time from when the operation of the air pump of the second secondary air supply unit is started to when the air switching valve of the second secondary air supply unit is opened so as to be shorter by the prescribed period of time than the period of time from when the operation of the air pump of the first secondary air supply unit is started to when the air switching valve of the first secondary air supply unit is opened.

With the above configuration, the time difference is provided between the operation start timings of the air pumps of the respective secondary air supply units, but the open timings of the air switching valves are set so as to be simultaneous with each other. Therefore, a voltage drop of the battery is suppressed, while the operation sounds of the air switching valves are superimposed on each other to hear as a single sound. Thus, with the above described configuration, while a voltage drop of the battery due to inrush currents of the air pumps is suppressed, it is possible to appropriately suppress a feeling of strangeness caused by the operation sounds of the air switching valves.

Note that, in the secondary air supply system according to the above aspects, the internal combustion engine may be formed such that cylinders are separately arranged in two banks, and the first secondary air supply unit and the second secondary air supply unit may be configured to respectively supply secondary air to one and the other of two exhaust pipes connected respectively to the cylinders of the respective banks.

A fourth aspect of the invention provides a secondary air supply method for an internal combustion engine including a plurality of secondary air supply units. Each of the secondary air supply units includes an electric air pump and an air switching valve. The electric air pump pressurizes air and discharges the pressurized air. The air switching valve opens to permit or closes to prohibit introduction of the air, discharged from the air pump, into exhaust gas. The secondary air supply method includes: providing a time difference between operation start timings of the air pumps of the respective secondary air supply units and a time difference between open timings of the air switching valves of the respective secondary air supply units; and setting the time difference between the open timings of the air switching valves so as to be shorter than the time difference between the operation start timings of the air pumps.

A fifth aspect of the invention provides a secondary air supply method for an internal combustion engine including a plurality of secondary air supply units. Each of the secondary air supply units includes an electric air pump and an air switching valve. The electric air pump pressurizes air and discharges the pressurized air. The air switching valve opens to permit or closes to prohibit introduction of the air, discharged from the air pump, into exhaust gas. The secondary air supply method includes: providing a time difference between operation start timings of the air pumps of the respective secondary air supply units; and setting open timings of the air switching valves of the respective secondary air supply units so as to be simultaneous with each other.

A sixth aspect of the invention provides a secondary air supply method for an internal combustion engine including a first secondary air supply unit and a second secondary air supply unit. Each of the first secondary air supply unit and the second secondary air supply unit includes an electric air pump and an air switching valve. The electric air pump pressurizes air and discharges the pressurized air. The air switching valve opens to permit or closes to prohibit introduction of the air, discharged from the air pump, into exhaust gas. The secondary air supply method includes: starting operation of the air pump of the second secondary air supply unit at the time when a prescribed period of time has elapsed from when operation of the air pump of the first secondary air supply unit is started; and setting a period of time from when the operation of the air pump of the second secondary air supply unit is started to when the air switching valve of the second secondary air supply unit is opened so as to be shorter than a period of time from when the operation of the air pump of the first secondary air supply unit is started to when the air switching valve of the first secondary air supply unit is opened.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
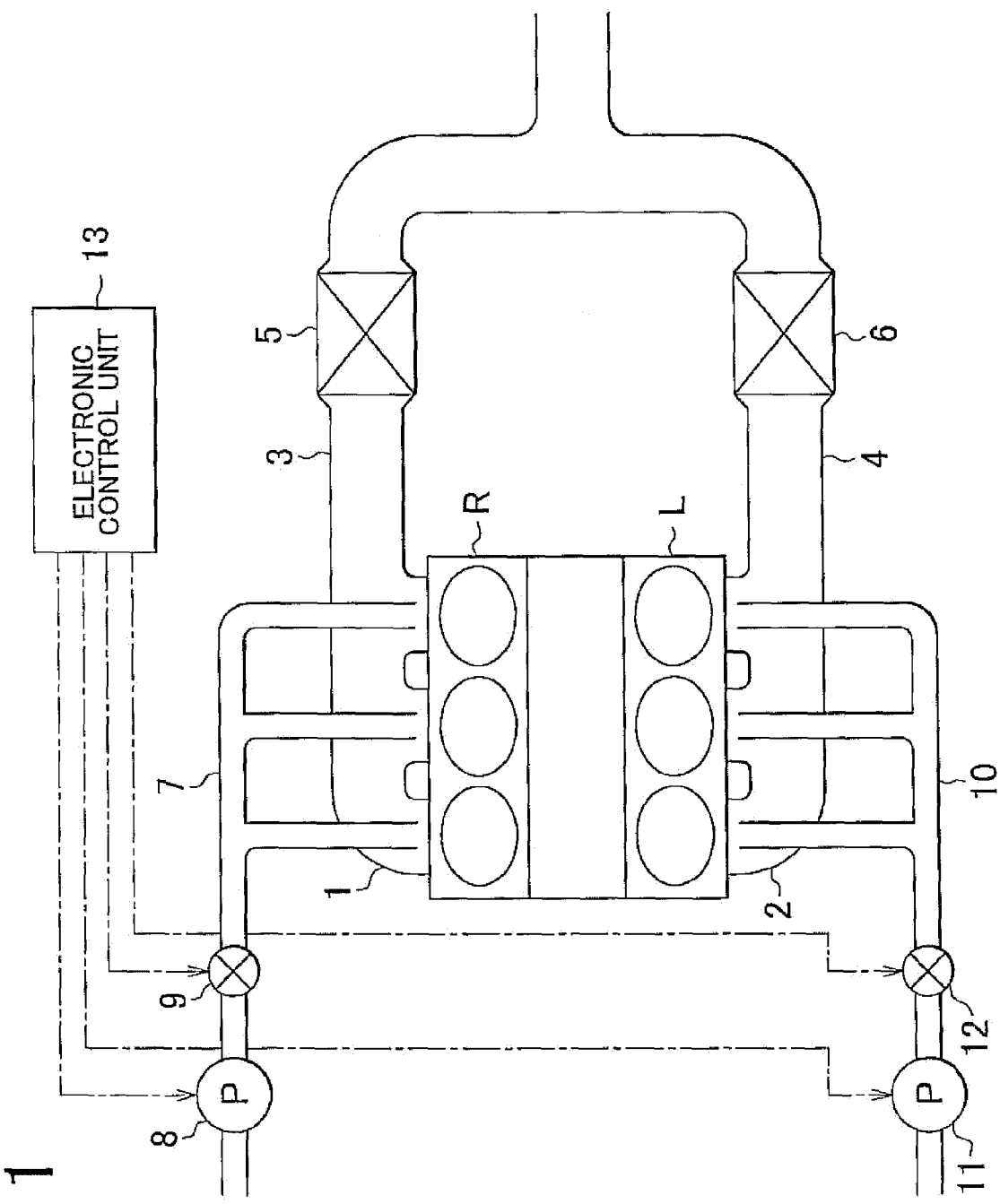
FIG. 1 is a view that schematically shows the configuration of a secondary air supply system according to one embodiment of the invention.

Hereinafter, a specific embodiment of a secondary air supply system for an internal combustion engine according to the aspect of the invention will be described in detail with reference to FIG. 1 to FIG. 3. The secondary air supply system according to the present embodiment is applied to a V-cylinder arrangement internal combustion engine in which cylinders are arranged separately in right and left banks.

First, the configuration of the secondary air supply system according to the present embodiment will be described with reference to FIG. 1. As shown in the drawing, each cylinder of the right bank R of the internal combustion engine to which the present embodiment is applied is connected to an exhaust pipe 3 via an exhaust manifold 1. The exhaust manifold 1 merges exhaust gas from each cylinder of the right bank R. A catalyst 5 for purifying exhaust gas is arranged in the exhaust pipe 3. In addition, each cylinder of the left bank L is connected to an exhaust pipe 4 via an exhaust manifold 2. The exhaust manifold 2 merges exhaust gas from each cylinder of the left bank L. A catalyst 6 for purifying exhaust gas is arranged in the exhaust pipe 4. Then, the exhaust pipes 3 and 4 are combined into one pipe on the downstream side of the catalysts 5 and 6.

A first secondary air supply passage 7 is connected to the exhaust manifold 1 of the right bank R. The first secondary air supply passage 7 is used to supply secondary air into exhaust gas. In the first secondary air supply passage 7, an electric first air pump 8 and a first air switching valve (ASV) 9 are arranged. The first air pump 8 pressurizes air and discharges the pressurized air. The first ASV 9 opens to permit or closes to prohibit introduction of air, discharged from the first air pump 8, into the exhaust manifold 1. Note that, in the present embodiment, a first secondary air supply unit is formed of these first secondary air supply passage 7, first air pump 8 and first ASV 9.

Similarly, a second secondary air supply passage 10 is connected to the exhaust manifold 2 of the left bank L. The second secondary air supply passage 10 is used to supply secondary air into exhaust gas. In the second secondary air supply passage 10, an electric second air pump 11 and a second ASV 12 are arranged. The second air pump 11 pressurizes air and discharges the pressurized air. The second ASV 12 opens to permit or closes to prohibit introduction of air, discharged from the second air pump 11, into the exhaust manifold 2. Note that, in the present embodiment, a second secondary air supply unit is formed of these second secondary air supply passage 10, second air pump 11 and second ASV 12.

The first air pump 8, the first ASV 9, the second air pump 11 and the second ASV 12 are controlled by an electronic control unit 13. The electronic control unit 13 governs engine control. The electronic control unit 13 includes a central processing unit (CPU), a read only memory (ROM) and a random access memory (RAM). The CPU executes various processings associated with engine control. The ROM stores programs and data for engine control. The RAM temporarily stores processing results of the CPU, detected results of sensors, and the like. Then, signals detected by various sensors for detecting an engine operating condition are input to the electronic control unit 13.

The electronic control unit 13 executes temperature increasing control over the catalysts 5 and 6 at the time of engine start as part of engine control. The temperature increasing control over the catalysts 5 and 6 is executed such that air (secondary air) is supplied into exhaust gas via the first secondary air supply passage 7 and the second secondary air supply passage 10 and the fuel injection amount is increased to enrich the air-fuel ratio of air-fuel mixture to be burned in each cylinder.

Figure 2:
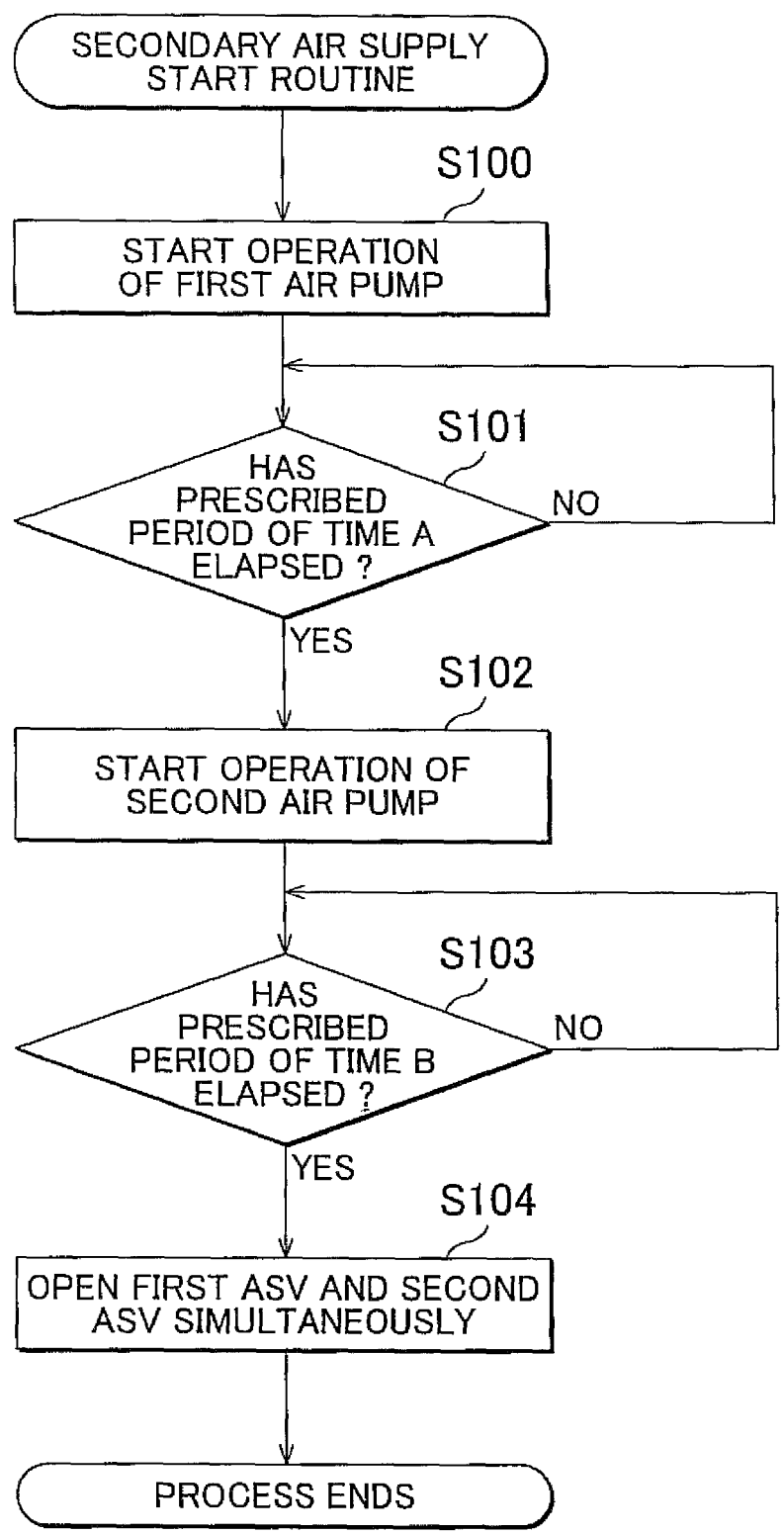
FIG. 2 is a flow chart that shows the procedure of secondary air supply start routine employed in the embodiment.
Figure 3:
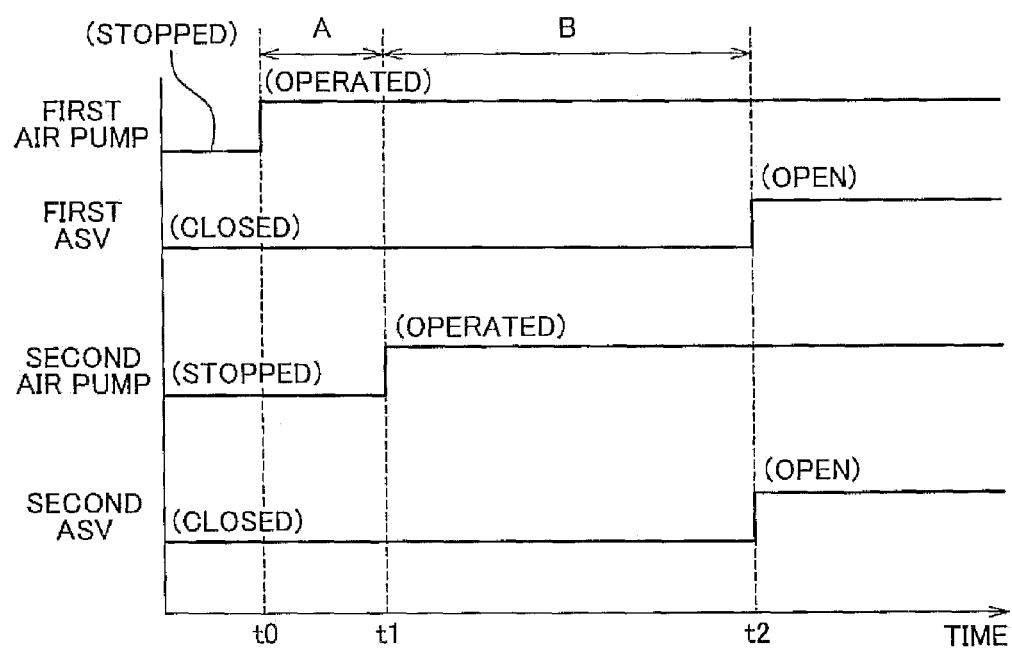
FIG. 3 is a time chart that shows a control mode at the time of starting supply of secondary air in the embodiment.

Supply of secondary air during such temperature increasing control over the catalysts 5 and 6 is started through the process of secondary air supply start routine shown in FIG. 2. Note that the process of the routine is executed by the electronic control unit 13 after temperature increasing control over the catalysts 5 and 6 is started.

As the process of the routine is started, the operation of the first air pump 8 is initially started in step S100. Then, in step S101, after waiting a lapse of a prescribed period of time A, the operation of the second air pump 11 is started in step S102. Note that the prescribed period of time A is set so as to be able to increase the time difference between the operation start timing of the first air pump 8 and the operation start timing of the second air pump 11 to an extent such that a voltage drop of the battery due to inrush current resulting from the start of operation of each air pump may be sufficiently suppressed.

After that, in step S103, after waiting a lapse of a prescribed period of time B, the first ASV 9 and the second ASV 12 are opened simultaneously in step S104. By so doing, supply of secondary air to the exhaust manifold 1 through the first secondary air supply passage 7 and supply of secondary air to the exhaust manifold 2 through the second secondary air supply passage 10 are started, and then the process of the routine is ended. Note that the prescribed period of time B is set as a period of time that takes until the pressure of secondary air supplied through the second secondary air supply passage 10 sufficiently increases from the start of the operation of the second air pump 11 and secondary air may be supplied into exhaust gas without delay.

Next, the operation of the above described present embodiment will be described with reference to FIG. 3. In the present embodiment, at time t0 at which temperature increasing control over the catalysts 5 and 6 is started, first, the operation of the first air pump 8 is started. Then, at time t1 at which the prescribed period of time A has elapsed from time t0, the operation of the second air pump 11 is started. In this way, in the present embodiment, the operation of the first air pump 8 and the operation of the second air pump 11 are started with the time difference corresponding to the prescribed period of time A, so the timings of occurrence of inrush currents resulting from the start of operations of both air pumps 8 and 11 deviate from each other, so a voltage drop of the battery is suppressed.

After that, at time t2 at which the prescribed period of time B has elapsed from time t1 at which the operation of the second air pump 11 is started, the first ASV 9 and the second ASV 12 are opened simultaneously. That is, in the present embodiment, a period of time from when the operation of the second air pump 11 is started to when the second ASV 12 opens is shorter by the prescribed period of time A than a period of time from when the operation of the first air pump 8 is started to when the first ASV 9 opens.

In the above present embodiment, the first ASV 9 and the second ASV 12 open simultaneously, so operation sounds of both ASVs 9 and 12 are superimposed on each other and hear as a single sound. Therefore, occurrence of operation sound having a tone that causes a feeling of strangeness because of occurrence of operation sounds of both ASVs at shifted timings is avoided.

With the secondary air supply system for an internal combustion engine according to the above described present embodiment, the following advantageous effects may be obtained.

(1) In the present embodiment, the first ASV 9 and the second ASV 12 are opened simultaneously while the time difference is provided between the operation start timings of the first air pump 8 and second air pump 11 to thereby cause the operation sounds of both ASVs 9 and 12 to be superimposed on each other and hear as a single sound. Therefore, it is possible to appropriately suppress a feeling of strangeness due to the operation sounds of the ASVs 9 and 12 while suppressing a voltage drop of the battery due to inrush currents of the air pumps 8 and 11.

Note that the above described embodiment may be modified into the following alternative embodiments.

In the above described embodiment, the first ASV 9 and the second ASV 12 are opened simultaneously; instead, even when the open timings of those valves are not perfectly simultaneous with each other, but when the time difference between the open timings of both valves is reduced to an extent such that the operation sounds of both valves hear as a single continuous sound, it is possible to suppress a feeling of strangeness due to valve operation sound to a lesser degree. Thus, when the time difference between the open timings of both ASVs 9 and 12 rather than the time difference between the operation start timings of both air pumps 8 and 11 is sufficiently reduced, it is possible to appropriately suppress a feeling of strangeness due to the operation sounds of the ASVs 9 and 12 while suppressing a voltage drop of the battery due to inrush currents of the air pumps 8 and 11. Then, in order for that, the period of time from when the operation of the second air pump 11 is started to when the second ASV 12 is opened just needs to be shorter than the period of time from when the operation of the first air pump 8 is started to when the first ASV 9 is opened.

In the above described embodiment, the secondary air supply system includes the two secondary air supply units each having the air pump and the ASV; instead, the aspect of the invention may also be applied to a secondary air supply system that includes three or more secondary air supply units. In that case as well, time differences are respectively provided between the operation start timings of the air pumps of the respective secondary air supply units and between the open timings of the respective ASVs, and the time difference between the open timings of the ASVs is shorter than the time difference between the operation start timings of the air pumps to thereby make it possible to suppress a feeling of strangeness due to the operation sounds of the ASVs while suppressing a voltage drop of the battery. In addition, when the open timings of the ASVs of the respective secondary air supply units are set so as to be simultaneous with each other, it is possible to further effectively suppress a feeling of strangeness due to the operation sounds of the ASVs.

In the above described embodiment, the secondary air supply system according to the aspect of the invention is applied to a V-cylinder arrangement internal combustion engine; instead, as long as a system that includes a plurality of secondary air supply units each having an air pump and an ASV, the aspect of the invention may be applied in a similar manner to that of the above described embodiment. For example, an in-line cylinder arrangement internal combustion engine may also be formed such that two exhaust pipes are provided and a catalyst is arranged in each of the exhaust pipes in order to suppress exhaust gas interference among the cylinders. In such an internal combustion engine, a secondary air supply system may be individually provided for each exhaust pipe, and the secondary air supply system according to the aspect of the invention may also be applied to such an internal combustion engine.

What is claimed is:

1. A secondary air supply system for an internal combustion engine including a plurality of secondary air supply units, each of the secondary air supply units including an electric air pump and an air switching valve, the electric air pump pressurizing air and discharging the pressurized air, and the air switching valve opening to permit or closing to prohibit introduction of the air, discharged from the air pump, into exhaust gas, the secondary air supply system comprising:
an electronic control unit operatively connected to the air pumps of the respective secondary air supply units and the air switching valves of the respective secondary air supply units,
the electronic control unit is configured to provide a time difference between operation start timings of the air pumps of the respective secondary air supply units and a time difference between open timings of the air switching valves of the respective secondary air supply units, the time difference between open timings of the air switching valves of the respective secondary air supply units is greater than zero,
the electronic control unit is configured to set the time difference between the open timings of the air switching valves so as to be shorter than the time difference between the operation start timings of the air pumps,
the electronic control unit starts the electric air pumps based on the time difference between operation start timings of the air pumps of the respective secondary air supply units,
the electronic control unit opens the air switching valves based on the time difference between open timings of the air switching valves of the respective secondary air supply units.

2. A secondary air supply system for an internal combustion engine including a plurality of secondary air supply units, each of the secondary air supply units including an electric air pump and an air switching valve, the electric air pump pressurizing air and discharging the pressurized air, and the air switching valve opening to permit or closing to prohibit introduction of the air, discharged from the air pump, into exhaust gas, the secondary air supply system comprising:
an electronic control unit operatively connected to the air pumps of the respective secondary air supply units and the air switching valves of the respective secondary air supply units,
the electronic control unit is configured to provide a time difference between operation start timings of the air pumps of the respective secondary air supply units, and configured to set open timings of the air switching valves of the respective secondary air supply units so as to be simultaneous with each other,
the electronic control unit starts the electric air pumps based on the time difference between operation start timings of the air pumps of the respective secondary air supply units,
the electronic control unit opens the air switching valves based on the set open timings of the air switching valves of the respective secondary air supply units,
wherein a time from the operation start timing of the air pump to the open timing of the air switching valve in one of the secondary air supply units is different from the operation start timing of the air pump to the open timing of the air switching valve in the other of the secondary air supply units.

3. A secondary air supply system for an internal combustion engine, the internal combustion engine including a first secondary air supply unit and a second secondary air supply unit, each of the first secondary air supply unit and the second secondary air supply unit including an electric air pump and an air switching valve, the electric air pump pressurizing air and discharging the pressurized air, and the air switching valve opening to permit or closing to prohibit introduction of the air, discharged from the air pump, into exhaust gas,
the secondary air supply system comprising:
an electronic control unit is operatively connected to the electric air pump and the air switching valve of the first secondary air supply unit, and the electric air pump and the air switching valves of the second secondary air supply unit,
the electronic control unit starts operation of the air pump of the second secondary air supply unit at the time when a prescribed period of time has elapsed from when operation of the air pump of the first secondary air supply unit is started, and
the electronic control unit is configured to set a period of time from when the operation of the air pump of the second secondary air supply unit is started to when the air switching valve of the second secondary air supply unit is opened so as to be shorter than a period of time from when the operation of the air pump of the first secondary air supply unit is started to when the air switching valve of the first secondary air supply unit is opened.

4. The secondary air supply system according to claim 3, wherein
the internal combustion engine is formed such that cylinders are separately arranged in two banks, and
the first secondary air supply unit and the second secondary air supply unit are configured to respectively supply secondary air to one and the other of two exhaust pipes connected respectively to the cylinders of the respective banks.

5. The secondary air supply system according to claim 1, wherein
the internal combustion engine is formed such that cylinders are separately arranged in two banks, and
the first secondary air supply unit and the second secondary air supply unit are configured to respectively supply secondary air to one and the other of two exhaust pipes connected respectively to the cylinders of the respective banks.

6. A secondary air supply method for an internal combustion engine including an electronic control unit and a plurality of secondary air supply units, each of the secondary air supply units including an electric air pump and an air switching valve operatively connected to the electronic control unit, the electric air pump pressurizing air and discharging the pressurized air, and the air switching valve opening to permit or closing to prohibit introduction of the air, discharged from the air pump, into exhaust gas,
the secondary air supply method comprising:
providing, by the electronic control unit, a time difference between operation start timings of the air pumps of the respective secondary air supply units and a time difference between open timings of the air switching valves of the respective secondary air supply units, the time difference between open timings of the air switching valves of the respective secondary air supply units is greater than zero;
setting, by the electronic control unit, the time difference between the open timings of the air switching valves so as to be shorter than the time difference between the operation start timings of the air pumps;
starting air pumps of the respective secondary air supply units based on the time difference between open timings of the air switching valves of the respective secondary air supply units; and
opening the air switching valves based on the time difference between open timings of the air switching valves of the respective secondary air supply units.

7. A secondary air supply method for an internal combustion engine including an electronic control unit and a plurality of secondary air supply units, each of the secondary air supply units including an electric air pump and an air switching valve operatively connected to the electronic control unit, the electric air pump pressurizing air and discharging the pressurized air, and the air switching valve opening to permit or closing to prohibit introduction of the air, discharged from the air pump, into exhaust gas,
the secondary air supply method comprising:
providing, by the electronic control unit, a time difference between operation start timings of the air pumps of the respective secondary air supply units; and
setting, by the electronic control unit, open timings of the air switching valves of the respective secondary air supply units so as to be simultaneous with each other,
starting the electric air pumps based on the time difference between operation start timings of the air pumps of the respective secondary air supply units,
opening the air switching valves based on the set open timings of the of the air switching valves of the respective secondary air supply units,
wherein a time from the operation start timing of the air pump to the open timing of the air switching valve in one of the secondary air supply units is different from the operation start timing of the air pump to the open timing of the air switching valve in the other of the secondary air supply units.

8. A secondary air supply method for an internal combustion engine including an electronic control unit and a plurality of secondary air supply units, each of the secondary air supply units including an electric air pump and an air switching valve operatively connected to the electronic control unit, the electric air pump pressurizing air and discharging the pressurized air, and the air switching valve opening to permit or closing to prohibit introduction of the air, discharged from the air pump, into exhaust gas, the secondary air supply method comprising:

starting, by the electronic control unit, operation of the air pump of the second secondary air supply unit at the time when a prescribed period of time has elapsed from when operation of the air pump of the first secondary air supply unit is started;

setting, by the electronic control unit, a period of time from when the operation of the air pump of the second secondary air supply unit is started to when the air switching valve of the second secondary air supply unit is opened so as to be shorter than a period of time from when the operation of the air pump of the first secondary air supply unit is started to when the air switching valve of the first secondary air supply unit is opened.

\* \* \* \* \*